(12) United States Patent
Toumazou

(10) Patent No.: US 11,250,225 B2
(45) Date of Patent: Feb. 15, 2022

(54) WRIST-WORN PRODUCT CODE READER

(71) Applicant: DNANUDGE LIMITED, London (GB)

(72) Inventor: Christofer Toumazou, London (GB)

(73) Assignee: DNANUDGE LIMITED, London (GB)

( * ) Notice: Subject to any disclaimer, the term of this patent is extended or adjusted under 35 U.S.C. 154(b) by 0 days.

(21) Appl. No.: 17/045,637

(22) PCT Filed: Apr. 1, 2019

(86) PCT No.: PCT/GB2019/050944
§ 371 (c)(1),
(2) Date: Oct. 6, 2020

(87) PCT Pub. No.: WO2019/193322
PCT Pub. Date: Oct. 10, 2019

(65) Prior Publication Data
US 2021/0089734 A1 Mar. 25, 2021

(30) Foreign Application Priority Data

Apr. 6, 2018 (GB) ..................... 1805765

(51) Int. Cl.
*G06K 7/10* (2006.01)
*G06F 1/16* (2006.01)
*G06F 3/01* (2006.01)

(52) U.S. Cl.
CPC ......... *G06K 7/10891* (2013.01); *G06F 1/163* (2013.01); *G06F 1/1694* (2013.01);
(Continued)

(58) Field of Classification Search
CPC ........... G06K 7/10554; G06K 7/10772; G06K 7/10623; G06K 7/10891;
(Continued)

(56) References Cited

U.S. PATENT DOCUMENTS 5,597,997 A 1/1997 Obata et al.
6,098,886 A * 8/2000 Swift .................. G06K 7/10891
235/462.44
(Continued)

FOREIGN PATENT DOCUMENTS

EP 2733579 A2 5/2014
JP 1994236452 8/1994
(Continued)

OTHER PUBLICATIONS

International Search Report, dated Jun. 19, 2019, and Written Opinion, issued in International Application No. PCT/GB2019/050944.

(Continued)

*Primary Examiner* — Thien M Le
(74) *Attorney, Agent, or Firm* — Saul Ewing Arnstein & Lehr LLP

(57) ABSTRACT

A wrist-worn device comprises a band or strap for attaching the device to a wearer's wrist; a product code reader comprising at least one optical component; a sensor; and a processor. The sensor is configured in use to detect rotation of the device indicative of a rotation of the device around a longitudinal axis of the wearer's wrist. The processor is coupled to the sensor and to the product code reader and is configured in use to activate the optical component, or place the device in a state in which a predefined subsequent action or actions can activate the optical component, when the sensor detects a rotation of the device over at least a predefined angle.

15 Claims, 3 Drawing Sheets

(52) U.S. Cl.
CPC ............ *G06F 1/1696* (2013.01); *G06F 3/017* (2013.01); *G06K 2007/10534* (2013.01)

(58) Field of Classification Search
CPC .......... G06K 2007/10534; G06F 1/163; G06F 1/1694; G06F 1/1696; G06F 3/017; G06F 3/0321; G06F 3/014; G06F 1/1684
USPC ............ 235/462.45, 462.44, 472.01, 472.02, 235/472.03
See application file for complete search history.

(56) References Cited

U.S. PATENT DOCUMENTS

| | | | |
|---|---|---|---|
| 9,092,684 | B1 | 7/2015 | Sundaram et al. |
| 9,900,061 | B1 | 2/2018 | Lui et al. |
| 10,283,219 | B2 * | 5/2019 | Karvela ................. G16H 10/40 |
| 2010/0102130 | A1 | 4/2010 | Madej et al. |
| 2013/0139068 | A1 * | 5/2013 | Bowring ................. G06F 3/048 715/747 |
| 2015/0100445 | A1 | 4/2015 | Johnson et al. |
| 2015/0281569 | A1 * | 10/2015 | Mizuno .............. G06K 9/00664 348/207.11 |
| 2016/0132707 | A1 * | 5/2016 | Lindbo .............. G06K 7/10722 235/462.42 |
| 2016/0267310 | A1 * | 9/2016 | AlNasser ........... G04B 37/1486 |
| 2016/0299570 | A1 | 10/2016 | Davydov |
| 2017/0161720 | A1 * | 6/2017 | Xing .................... A61B 5/4848 |
| 2017/0323057 | A1 | 11/2017 | Karvela et al. |
| 2018/0167549 | A1 * | 6/2018 | Lim .................. G06K 7/10554 |
| 2019/0196535 | A1 * | 6/2019 | Paufler ................. G06F 3/0346 |

FOREIGN PATENT DOCUMENTS

| | | |
|---|---|---|
| JP | 2012238224 A | 12/2012 |
| KR | 10-2016-0077070 | 7/2016 |
| KR | 10-2017-0048073 | 5/2017 |
| WO | 2015054034 A1 | 4/2015 |
| WO | 2016170445 A2 | 10/2016 |
| WO | 2017055867 A1 | 4/2017 |

OTHER PUBLICATIONS

Combined Search and Examination Report, dated Sep. 6, 2018, issued in priority GB Application No. GB1805765.3.

* cited by examiner ular purposes, such as tracking, stock control or shopping. For example, many supermarket products carry a label

WRIST-WORN PRODUCT CODE READER

CROSS REFERENCE TO RELATED APPLICATIONS

This application claims the priority of International Application No. PCT/GB2019/050944, filed on Apr. 1, 2019, which claims priority to GB Application No. 1805765.3, filed Apr. 6, 2018, the entire contents of which are fully incorporated herein by reference.

TECHNICAL FIELD

The present invention relates to a wrist-worn product code reader and in particular, though not necessarily, to a wrist-worn product code reader configured to read product barcodes.

BACKGROUND

Product codes are a common way of identifying products for many purposes, such as tracking, stock control or shopping. For example, many supermarket products carry a label that is printed with a barcode comprising alternating black and white stripes whose widths encode information about the product and/or an identifier for the product which can be used to retrieve information about the product from a database. Product codes may also encode information along a second dimension, i.e. in the form of a 2D matrix, as is the case in a QR Code™.

Product codes are typically read using an electronic device ("reader" or "scanner") which has a light source for illuminating the surface of the product or label and an optical sensor, such as a charge-coupled device (CCD), for converting reflected light into electrical signals for processing. In order to read the product code with high fidelity, it is often necessary to use a bright light source such as a laser. It can be important that the light source is switched off when it is not being used to read a product code in order to prevent the user (or those nearby) from being dazzled. This is particularly true for product code readers which the user can point, e.g. handheld product code readers such as pens or wands. A known barcode reader, for example, requires the user to hold down a trigger in the handle of the device in order to activate a laser light source.

Although some portable product code readers rely on ambient light to illuminate the product code, e.g. relying on a camera to capture a product code, it is still important that these readers are activated only when they are being used for reading in order to conserve battery power or to avoid privacy concerns associated with the device having a camera which is always on.

WO2017/055867 describes a system for providing guided product information to consumers based upon the consumers' personal genetic information. The system proposes the use of a wrist worn product scanner which is able to scan product barcodes, match these to products and product recommendations based upon the product contents and the wearer's personal genetics, and provide a product recommendation, e.g. via a visible display. Considering the problems of known product scanners detailed above, it would be desirable to provide some means to allow the wearer of the wrist band described in W2017/055867 with a simple and efficient means for turning the scanner on and off (e.g. to save power and/or avoid dazzle). Clearly a button could be incorporated into the device, or the device could be configured to "wake-up" when the device is tapped by the wearer's finger or when the wearer shakes his or her wrist. However, such approaches are likely to result in occasional unintended activation of the device.

SUMMARY

According to a first aspect of the invention there is provided a wrist-worn device comprising a band or strap for attaching the device to a wearer's wrist; a product code reader comprising at least one optical component; a sensor configured in use to detect rotation of the device indicative of a rotation of the device around the longitudinal axis of the wearer's wrist; and a processor. The processor is coupled to the sensor and to the product code reader and is configured in use to activate the optical component, or place the device in a state in which a predefined subsequent action or actions can activate the optical component, when the sensor detects a rotation of the device over at least a predefined angle.

Rotation of the device around the longitudinal axis of the wearer's wrist may include rotation of the device around the wearer's wrist (i.e. rotation of only the device around the axis), or rotation of the wearer's wrist together with the device (i.e. rotation of the device is effected by the wearer rotating his or her wrist), or from a combination of both such types of rotation.

The predefined angle may be: greater than 20 degrees, preferably greater than 30 degrees, or more preferably greater than 45 degrees.

The processor may be configured in use to activate the optical component, or place the device in said state, only if the detected rotation occurs in less than a predefined time, for example two seconds or, more preferably, one second.

The processor may be configured in use to activate the optical component, or place the device in said state, only if the detected rotation is in a predefined direction.

The optical component may comprise a light source for illuminating the product or product code, for example a laser or light emitting diode. The optical component may comprise a camera.

The product code reader may be a barcode reader.

The sensor may comprise one or more of a gyroscope and an accelerometer.

The processor may be configured in use to de-activate the optical component in response to the sensor detecting a subsequent rotation of the device over at least a further predefined angle.

The processor may be further configured in use to de-activate the optical component after a predetermined time has elapsed following activation of the optical component.

The processor may be further configured in use to de-activate the optical component after the product code reader has read a product code.

The device may comprise an indicator for providing the user with a recommendation associated with the product.

The device may comprise a memory storing product codes and associated product recommendations derived from personalised genetic information obtained from an analysis of a biological sample provided by the user.

The predefined subsequent action or actions for activating the device may comprise a movement or movement sequence of the device indicative of a gesture performed by the wearer of the device, the sensor being configured in use to detect said movement or movement sequence. The movement or movement sequence may be indicative of a gesture directing the optical component of the product code reader towards a product. The gesture may comprise raising the wristband.

According to a second aspect of the present invention there is provided a wrist-worn device comprising a band or strap for attaching the device to a wearer's wrist; a product code reader comprising a laser barcode scanner; a sensor configured in use to detect a movement or movement sequence of the device indicative of a predefined gesture; and a processor. The processor is coupled to the sensor and to the product code reader and is configured in use to activate the laser barcode scanner when the sensor detects said movement or sequence of movements.

According to a third aspect of the present invention there is provided a method of operating a wrist-worn device comprising a band or strap for attaching the device to a wearer's wrist, the method comprising detecting rotation of the device indicative of a rotation of the device around a longitudinal axis of the wearer's wrist over at least a pre-defined angle and, upon such detection, activating an optical component of a product code reader or placing the device in a state in which a predefined subsequent action or actions can activate the optical component. The product code reader may be a barcode reader, with the optical component being a laser or an LED.

According to a fourth aspect of the present invention there is provided a wrist-worn device comprising: a band or strap for attaching the device to a wearer's wrist; a barcode reader comprising a laser or light emitting diode for illuminating a barcode when activated; a sensor configured in use to detect rotation of the device indicative of a rotation of the device around a longitudinal axis of the wearer's wrist; and a processor coupled to said sensor and to said barcode reader and being configured in use to activate the laser or light emitting diode, or place the device in a state in which a predefined subsequent gesture can activate the laser or light emitting diode, when the sensor detects said rotation of the device over at least a predefined angle.

DETAILED DESCRIPTION

In order to solve the problems described above, a wrist-worn product code reader (or "wristband") which is activated by rotating the device is proposed. In some scenarios, the wristband is worn in one rotational orientation on the wrist, one that is most comfortable for the wearer, for example. The wristband is then rotated around the wearer's wrist to another orientation so that is can be used. Activating the wristband in response this rotation provides a straightforward and convenient way for wearer to operate the device. This mode of activation allows the wristband to be used without the wearer needing to locate and then press or hold down a button. Conversely, it provides a positive means for activating the wristband which significantly reduces the risk of accidental activation.

Figure 1:
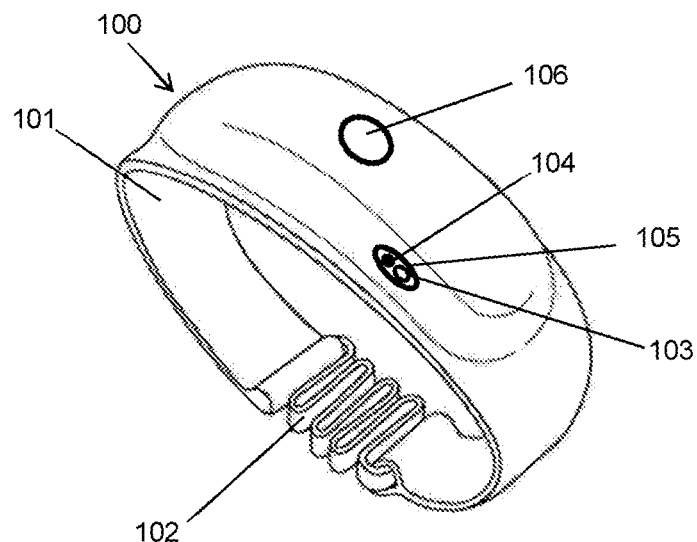
FIG. 1 is a perspective schematic view of a wrist-worn product code reader according to an embodiment of the invention.
Figure 4:
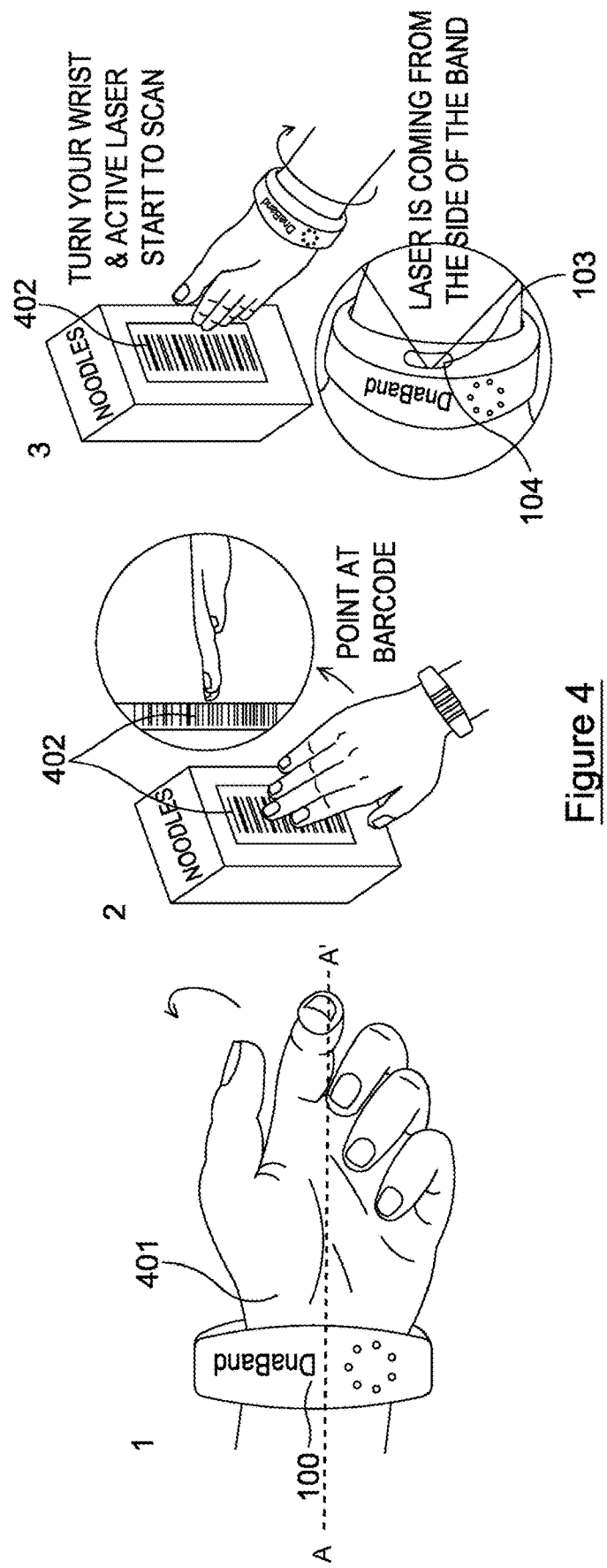
FIG. 4 is a sequence diagram illustrating how the product code reader of FIGS. 1 and 2 may be activated.

FIG. 1 illustrates a wrist-worn product code reader 100 or wristband which can be activated by rotation around a longitudinal axis of the wearer's wrist. The wristband 100 comprises a strap 101, which in this example has an expandable section 102 to allow the user to slide the wristband 100 easily over his or her wrist. In other examples, a wriststrap, such as those found on wristwatches, may be used in place of the strap with expandable section. FIG. 4, which is discussed in more detail below, shows the wristband 100 being worn on the wrist of a wearer.

The wristband 100 comprises an optical sensor 103, such as a photovoltaic cell, and a light source 104, such as a laser. A window 105 is provided in the wristband 100 to allow the optical sensor 103 to be used for reading product codes and the light source 104 to be used to illuminate the product code. An indicator (or indicators), such as a light emitting diode (LED) 106, is also provided in order to give feedback to the wearer about a product.

The cross section of the strap 101 is thicker on one side in order to accommodate the components of the product code reader 100 (see below). Typically, users may prefer to wear the wristband 100 with this thicker side on the outside of their wrist as this orientation is generally more comfortable and because this is how wristwatches are normally worn.

Figure 2:
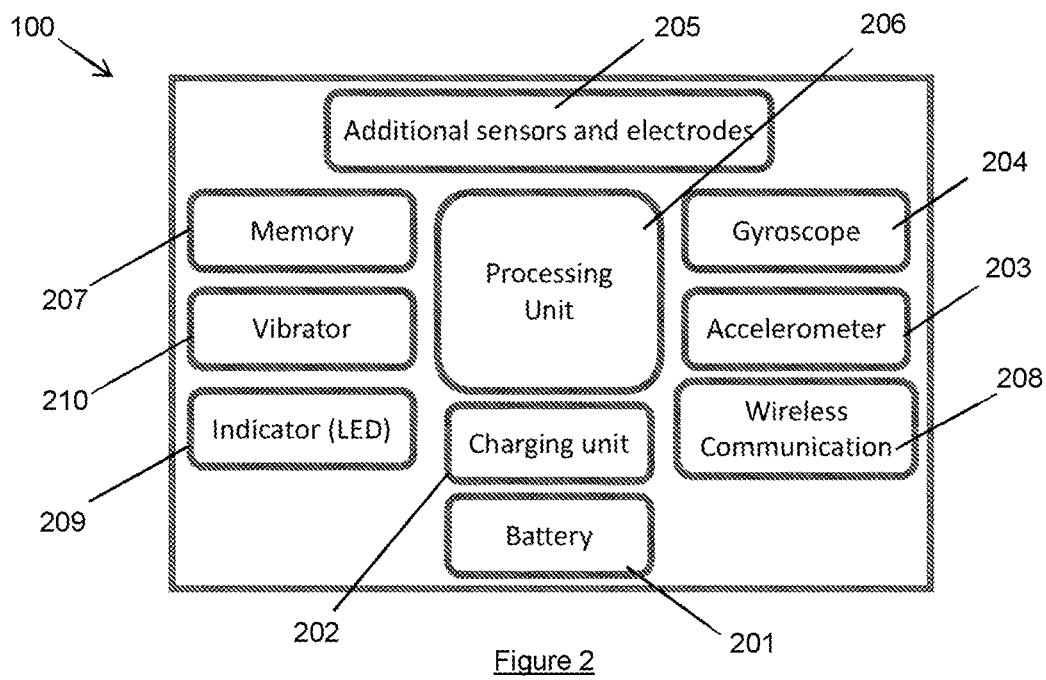
FIG. 2 is a schematic system view of the product code reader of FIG. 1.

FIG. 2 shows a schematic system view of the wristband 100.

The wristband 100 is powered by a battery 201, which can be charged using a charging unit 202, and has an accelerometer 203 and/or a gyroscope 204 for measuring the movement of the wristband 100 in 3D space. The wristband 100 may also comprise additional sensors and electrodes 205, such as a heart monitor (e.g. an electrocardiogram, ECG) or thermometer for measuring the user's heart rate or temperature, and/or a GPS sensor for tracking the user's location.

The wristband 100 is controlled by a processing unit 206 which accesses instructions and data stored in a memory 207. A wireless communication module 208 is provided to allow the processing unit 206 to communicate with other computer devices such as other wristbands, smartphones, smartwatches or personal computers. The wireless communication module 208 can be used, for example, to provide or update a database of product codes and/or product recommendations stored in memory 207. The wireless communication module 208 may allow data to be exchanged between wristbands 100.

An indicator 209, such as a light emitting diode (LED) and/or a vibrator 210, is provided in order to provide visual or tactile feedback to the user wearing the wristband 100.

In its default state or "standby mode", the wristband 100 is typically deactivated i.e. the light source and/or the optical sensor are turned off, although the other components may still be turned on. This allows the device to be worn without the light source causing annoyance or potential harm to anyone and also helps conserve battery power. To use the wristband 100, the user rotates the wristband 100 around his or her wrist. For example, the user may rotate the wristband 100 from an orientation in which the thicker region of the strap 101 is on the outside of the wrist to an orientation in which that thicker region is on the inside of the wrist. This movement is measured by the gyroscope 204 and/or the accelerometer 203 and encoded in one or more signals which are provided to the processing unit 206 for processing whilst the wristband 100 is in standby mode. The processing unit 206 then activates the wristband 100 if the signal meets a predefined criterion or criteria.

Following activation of the wristband 100, the wearer may direct the light source 104 on to a product in order to read a product code (or other information) from the product using the optical sensor 103. The wearer may manipulate or hold the product using either one of their hands, or both of their hands together, in order to orient the product correctly for reading. Alternatively, the wearer may move or orient the wristband 100 in order to read the product code whilst the product remains in place on a supermarket shelf (for example). After reading the product code, the wristband may provide feedback to the wearer using the indicator 209.

The processing unit 206 deactivates the wristband 100 by turning off the light source 104 and optical sensor 103 and re-entering standby mode. This may occur automatically after a predetermined "timeout" period (e.g. a period in the range 1-60 s) following activation of the wristband 100 and/or after a product code has been read successfully using the wristband 100. Alternatively, the wristband 100 may be deactivated in response to a further movement or gesture, such as a further rotation of the wristband 100, e.g. a rotation in the opposite direction to the rotation used to activate the wristband 100.

Figure 3:
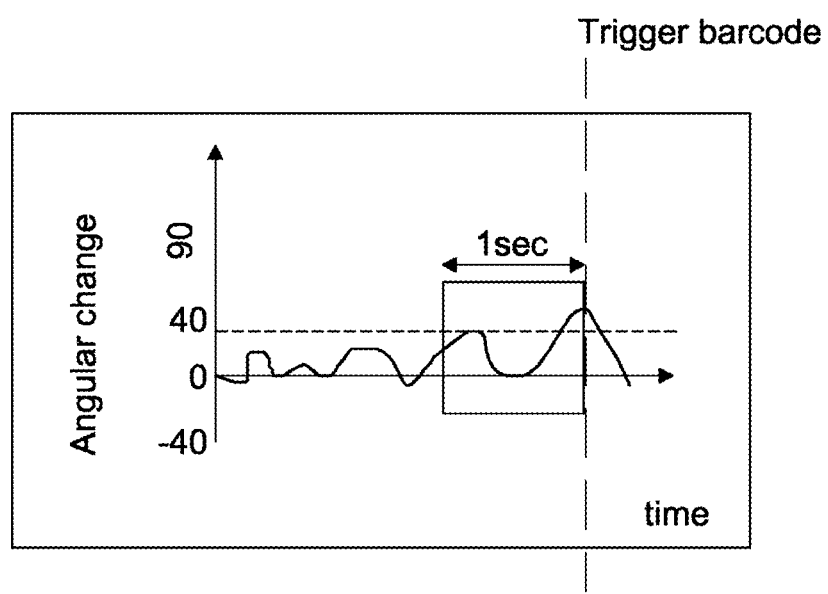
FIG. 3 illustrates diagrammatically how the product code reader of FIGS. 1 and 2 may be activated.

FIG. 3 illustrates diagrammatically how the wristband 100 can be activated based on a signal which describes the rotation or "angular change" of the wristband 100 (plotted on the vertical axis) with respect to time (plotted on the horizontal axis). In this example, an angular change of greater than 40 degrees occurring within a 1 second window is used to trigger the activation of the product coder reader 100. In this case, a buffer of 1 second may be sufficient to process the signal. Other criteria can of course be used. For example, the activation may be triggered once the integrated angular change within a certain time exceeds a certain threshold. The criteria (or criterion) used to trigger activation of the wristband 100, the "trigger pattern", may be chosen to minimise the chance that the wristband 100 is activated accidentally, i.e. by movements the wearer did not intend or expect to cause activation.

The trigger pattern may be personalised by measuring and learning an individual's preferred movement of the wristband 100. To do so, there may be an initial learning phase, when the user is wearing the wristband 100 for the first time (or first time after the system has been reset), in which the product code reader 100 can be activated by a wide range of movements. However, by having the user repeat the movement in several different trials, a preferred type and/or range of movement can be determined for that particular user. For instance, one person might, on their first attempt at using the product code reader 100, rotate the wristband 100 about their wrist through an angle of 35 degrees in 0.8 s before they notice that the laser light source has been activated. On subsequent training attempts, the angular change may be, for example: 40 degrees in 1 s; 35 degrees in 0.8 s; and 35 degrees in 0.95 s. Based on these attempts, an angular threshold of 35 degrees in a 1 second window may be an appropriate trigger pattern for this user. To enable this functionality, the wristband 100 may be configured to communicate with a wearer's smartphone, e.g. via Bluetooth™ wireless connection.

The indicator 209 and the vibrator 210 may provide feedback to the user regarding a product which has been scanned. For example, the memory 207 of the wristband 100 may store a database of personalised product recommendations which have been generated based on the results of genetic testing performed on a biological sample provided by the user. When a product code is scanned using the wristband 100, the processing unit 209 retrieves a product recommendation from the database e.g. by identifying the product or class of product using the product code. The indicator 209 then displays a green light or a red light according to whether the product is suitable for the user. A blue light may be displayed (for example) if the product cannot be identified. Information about the system may also be indicated, such as low battery charge or the existence of a fault. In some embodiments, the indicator 209 may not be physically located within the wristband 100, but instead provided by another device, preferably a wearable device, such as a smartphone, smart watch or earphones.

The above discussion has focused on the wristband 100 being activated in response to a rotation about the wrist of the wearer. However, in another embodiment of the invention, the wristband 100 is not rotated relative to the wearer's wrist, but rather the wearer's wrist and the wristband 100 are rotated or otherwise moved in unison to activate the wristband 100.

FIG. 4 shows a how the wristband 100 may be activated using a sequence of movements according to a further aspect of the invention. In the example shown in FIG. 4, the wearer is wearing the wristband 100 with the optical sensor 103 and laser light source 104 on the inside of their wrist 401, as shown in frame 1. The wearer then raises their arm so that their hand/wrist 401 is pointing towards a barcode 402, as shown in frame 2. The processor identifies this movement from the signals provided by the accelerometer 203 and/or gyroscope 204. For example, the processor may identify that a relatively significant movement of the wristband 100, corresponding to the user moving their hand to the pointing position, followed by a period comprising no or only very small movements, corresponding to the user holding their hand steady. After identifying this movement sequence the processing unit 206 comes out of standby mode but does not activate the product code reader 100, i.e. the processing unit 206 enters a "pre-activated" mode. If no subsequent motion for activating the product code reader 100 is identified with a certain period (e.g. 1 s) then the processing unit 206 may return to standby mode.

As discussed above, one type of gesture which can be used to activate the wristband 100 is a rotation of the wristband 100 around the longitudinal axis of the wearer's wrist, which is indicated in FIG. 4 by the broken line A-A'.

Other movement sequences may be also be used to activate the wristband 100. For example, the wearer may rotate the wristband 100 about their wrist to bring the wristband 100 into the pre-activated mode and then activate the wristband 100 using a further movement or gesture. For example, such a further gesture may be the wearer projecting his or her wrist towards a product in order to read a product label using the wristband 100. For example, if the optical sensor 103 is located on the inside of the wearer's wrist when the wristband 100 is in the pre-activated mode, the wearer may bend their wrist outwards (away from their body) to direct the optical sensor towards the product. This bending motion may be detected by the accelerometer 203 and/or a gyroscope 204 and used to trigger activation of the wristband 100. Alternatively, or additionally, activation of the wristband 100 may be triggered by raising the wristband 100.

In some cases, the wristband 100 may include a user input receiver (such as button or touch screen interface) which can be used to activate the wristband 100 (i.e. turn on the light source 104). The light source 104 remains illuminated for a pre-defined time, such as 10 seconds, 30 seconds or 1 minute, before it is turned off again. The light source 104 can subsequently be re-activated using a gesture, such as rotation of the wristband 100 around the wearer's wrist (or rotation of the wearer's wrist itself), provided this gesture is performed within a certain period, such as 1 minute or 5 minutes, or 10 minutes, after the light source 103 was turned off. This mode of operation helps guard against accidental activation of the wristband 100 when the user is performing activities other than shopping, for example.

As shown in frame 3, the user then rotates their hand through 90 degrees to activate the product code reader 100. The processing unit 206 turns on the laser light source which is projected through the window 105 and on to the barcode 402. The optical sensor 103 sensor then reads the barcode 402.

The movement of the wristband 1001 may also be processed using an embedded program to identify when the user performs a certain activity, such as running, cycling, walking, sleeping, eating or drinking. For example, the accelerometer 203 and/or gyroscope 204 may measure a movement or trajectory for the wristband 1001 which matches a pattern described by the equation $ax(t)+by(t)+cz(t)=d$. [Where $x(t)$, $y(t)$ and $z(t)$ each represent a position for the wristband 1001 in one of three orthogonal directions at a particular time, $t$, and where $a$, $b$, $c$ and $d$ are constants.] This pattern matching may be used to infer the activity being performed by the user, e.g. if the pattern is associated with a hand-to-mouth movement then it may be possible to infer that the user is eating or drinking. The product code reader 100 may be trained to recognise different activities in a similar way to the activation function described above. For convenience, the training can be carried out with the assistance of another device, such as smart phone.

The product code reader 100 may also be paired with another wearable unit, for example a smart watch. This way, data from the other wearable device may be provided to the product code reader 100 to help improve the detection of hand movements or for identifying user activity (such as eating or drinking).

Logging the movements associated with eating or drinking allows the frequency of having meals and their duration to be measured. This information can be used to help with better management of dietary habits.

The invention claimed is:

1. A wrist-worn device comprising:
   a band or strap for attaching the device to a wearer's wrist;
   a barcode reader comprising a laser or light emitting diode for illuminating a barcode when activated;
   a sensor configured in use to detect rotation of the device indicative of a rotation of the device around a longitudinal axis of the wearer's wrist;
   a processor coupled to said sensor and to said barcode reader and being configured in use to activate the laser or light emitting diode, or place the device in a state in which a predefined subsequent gesture can activate the laser or light emitting diode, when the sensor detects said rotation of the device over at least a predefined angle; and
   an indicator for providing the wearer with a recommendation associated with the product.

2. The device according to claim 1, wherein the predefined angle is greater than 20 degrees.

3. The device according to claim 1, wherein the processor is configured in use to activate the laser or light emitting diode, or place the device in said state, only if the detected rotation occurs in less than a predefined time.

4. The device according to claim 1, wherein the processor is configured in use to activate the laser or light emitting diode, or place the device in said state, only if the detected rotation is in a predefined direction.

5. The device according to claim 1, wherein the sensor comprises one or more of a gyroscope and an accelerometer.

6. The device according to claim 1, wherein the processor is configured in use to de-activate the laser or light emitting diode in response to the sensor detecting a subsequent rotation of the device over at least a further predefined angle.

7. The device according to claim 1, wherein the processor is further configured in use to de-activate the laser or light emitting diode after a predetermined time has elapsed following activation of the laser or light emitting diode.

8. The device according to claim 1, wherein the processor is further configured in use to de-activate the laser or light emitting diode after the barcode reader has read a barcode.

9. The device according to claim 1 and further comprising a memory storing product codes and associated product recommendations derived from personalised genetic information obtained from an analysis of a biological sample provided by the user.

10. The device according to claim 1, wherein said predefined subsequent action or actions for activating the device comprises a movement or movement sequence of the device indicative of a gesture performed by the wearer of the device, said sensor being configured in use to detect said movement or movement sequence.

11. The device according to claim 10, wherein said movement or movement sequence is indicative of a gesture directing the laser or light emitting diode of the barcode reader towards a product.

12. The device according to claim 10, wherein said gesture comprises raising the wristband.

13. The device according to claim 1, wherein the laser or light emitting diode is arranged to emit light for reading the barcode in a direction parallel to a longitudinal axis of the wearer's wrist.

14. The method of operating a wrist-worn device comprising a band or strap for attaching the device to a wearer's wrist, the method comprising detecting rotation of the device indicative of a rotation of the device around a wearer's wrist over at least a pre-defined angle, upon such detection, activating a laser or light emitting diode of a barcode reader or placing the device in a state in which a predefined subsequent action or actions can activate the laser or light emitting diode, wherein activation of the laser or light emitting diode is for illuminating a barcode, and providing the wearer with a recommendation associated with the product using an indicator of the wrist-worn device.

15. The method according to claim 14, wherein the laser or light emitting diode is arranged to emit light for reading the barcode in a direction parallel to a longitudinal axis of the wearer's wrist.

\* \* \* \* \*